United States Patent [19]

Engelhaupt et al.

[11] Patent Number: 4,986,130

[45] Date of Patent: Jan. 22, 1991

[54] APPARATUS AND METHOD FOR MONITORING STRESS AS A COATING IS APPLIED

[76] Inventors: Darell E. Engelhaupt, 702 Tatom St. NW., Huntsville, Ala. 35805; Kurt H. Irlesberger, 337 Wekiva Springs Rd., Longwood, Fla. 32779

[21] Appl. No.: 422,887

[22] Filed: Oct. 19, 1989

[51] Int. Cl.[5] ................................................ G01B 5/30
[52] U.S. Cl. ...................................... 73/760; 204/407
[58] Field of Search ............ 73/760, 787, 37.5, 150 R, 73/749; 204/407

[56] References Cited

U.S. PATENT DOCUMENTS

| | | | |
|---|---|---|---|
| 2,568,713 | 9/1951 | Brenner | 73/150 |
| 2,829,517 | 4/1958 | Kushner | 73/150 |
| 2,942,219 | 6/1960 | McGrath | 73/753 X |
| 3,215,609 | 11/1965 | Chapdelaine | 204/1 |
| 3,356,597 | 12/1967 | Schmidt | 204/1 |
| 3,356,605 | 12/1967 | Schmidt | 204/195 |
| 3,437,568 | 4/1969 | Hasselmann et al. | 204/3 |
| 3,570,449 | 3/1971 | Blecherman et al. | 118/9 |
| 4,086,153 | 4/1978 | Ariga et al. | 204/181 R |
| 4,086,154 | 4/1978 | Hicks | 204/195 R |
| 4,479,980 | 10/1984 | Acosta et al. | 427/10 |
| 4,647,365 | 3/1987 | Irlesberger et al. | 204/434 |
| 4,648,944 | 3/1987 | George et al. | 204/1 T |

OTHER PUBLICATIONS

Vaaler et al. "Electroforming Nickel with Dynamic Stress Control", *Plating and Surface Finishing*, Mar. 1988, pp. 54–58.
Weil, R. "The Origins of Stress in Electrodeposits", *Plating*, Part I, Dec. 1970, pp. 1231–1237.
Part II, Jan. 1971, pp. 50–56.
Part III, Feb. 1971, pp. 137–146.

*Primary Examiner*—Jerry W. Myracle
*Attorney, Agent, or Firm*—Hodgson Russ Andrews Woods & Goodyear

[57] ABSTRACT

Apparatus and method for monitoring stress in a coating of material. The apparatus has a fluid-filled chamber and a deformable diaphragm on which the coating is applied forming a wall of the chamber, the fluid, which is generally incompressible, having a pressure due to pressing of the diaphragm against the fluid which is indicative of stress in the coating. The apparatus also includes a pressure transducer in communication with the fluid for sensing the fluid pressure and converting the fluid pressure to electrical signals whereby the electrical signals are indicative of the stress in the coating of material.

20 Claims, 2 Drawing Sheets

APPARATUS AND METHOD FOR MONITORING STRESS AS A COATING IS APPLIED

The present invention relates to processes for applying coatings of material such as, for example, plating metallic surfaces in an electrodeposition process, vacuum deposition, or electroless deposition (autocatalytic). The present invention has application generally any time a coating of material is applied to a substrate. More specifically, the present invention relates to apparatus and methods for accurately monitoring the stress produced in a coating being applied to a surface of an object or substrate and for controlling the coating process in response to this stress.

Distortion of lattice structure due to metallurgical disparities in an electrodeposited or catalytically deposited metal may cause either tensile or compressive internal stress. There have be attempts in the art to monitor this stress by instruments which measure micro-strain or deformation in a deformable receptor which is undergoing the deposition of a coating under similar conditions as the item of interest is being coated. For example, U.S. Pat. Nos. 4,647,365 to Irlesberger and Engelhaupt, the applicants in the present application, and 4,648,944 to George et al, of which the applicants of the present invention are co-inventors thereof, disclose stress-monitoring apparatus for use in electroforming and electroplating processes wherein the stress is measured by a strain gauge. Another example of apparatus for determining stress in an electrodeposit is a spiral contractometer as disclosed in U.S. Pat. No. 4,086,154 to Hicks. Stress monitoring methods have included applying a restoring force to a non-deformably substrate and calculating the stress therefrom by X-ray diffraction, and the use of differential scanning calorimetry. In accordance with a deposit stress analyzer of Electrochemicals Company Inc. of York, Pa., a holding fixture allows plating of split strip on one side only. The split strips are attached to a block and are coated on one side, stress in the plating causes the strips to bend, and the spread in the tip of the strips indicates the stress. In accordance with a spiral contractormeter of Quality Control Instruments of Oak Ridge, Tenn., a metal spiral is plated on one side, the spiral winds or unwinds turning a dial, and the reading can be converted to stress. In accordance with an internal stress monitor of OMI International Corporation of Nutley, N.J., plating on a thin metal strip which is rigidly mounted moves a dial indicator due to expansion or contraction.

Various methods of measuring stress in a coating being applied or related processes are disclosed in the following U.S. Pat. Nos.:
- 4,479,980 to Acosta et al
- 2,568,713 to Brenner
- 4,086,153 to Ariga et al
- 3,437,568 to Hasselmann et al
- 3,356,605 to Schmidt
- 3,356,597 to Schmidt
- 3,215,609 to Chapdelaine
- 2,829,517 to Kushner
- 3,570,449 to Blecherman et al The theory of stress control during application of coatings is discussed in "Electroforming Nickel With Dynamic Stress Control" by Vaaler et al, Plating and Surface Finishing, March, 1988, pages 54 to 58; "The Origins of Stress in Electrodeposits", Part I, by R. Weil, Plating, December, 1970, pages 1231 to 1237; "The Origins of Stress in Electrodeposits", Part II, by R. Weil, Plating, January, 1971, pages 50 to 56; "The Origins of Stress in Electrodeposits", Part III, by R. Weil, Plating, February, 1971, pages 137 to 146.

Presently available apparatus for monitoring stress suffers various disadvantages. Such apparatus often includes linkage, foil strain gauges, or non-constrained components which undersirably require periodic replacement. Other disadvantages of such presently available apparatus include poor accuracy and repeatability due to solution agitation, the requirement of stripping of the substrate for repeat tests, difficulties in stripping and preparing the sample substrate for tests, inaccuracy, and the apparatus may be larger and/or heavier than desired. Foil strain gauge devices require expensive interface devices.

It is, therefore, an object of the present invention to provide a stress-monitoring apparatus which does not require replacement of parts.

It is another object of the present invention to provide such an apparatus wherein repeat tests may be conducted with stripping of the sample substrate deferred for a number of perhaps 20 tests.

It is a further object of the present invention to provide such an apparatus which is reliable, accurate, rugged, light-weight, of small size, portable, and of competitive cost.

In accordance with the present invention, apparatus is provided which includes a deformable diaphragm forming one wall of a chamber and having an outer surface for receiving a coating of material, deformation of the diaphragm being indicative of the stress in the coating, a fluid in the chamber and in contact with the diaphragm to have a pressure indicative of deformation thereof, and a pressure transducer in contact with the fluid to sense the fluid pressure and convert the fluid pressure to electrical signals whereby the electrical signals are indicative of the stress in the coating of material. Deformation of the diaphragm thus creates a pressure in the fluid which is then transmitted to the pressure transducer.

A BRIEF DESCRIPTION OF THE DRAWINGS

DETAILED DESCRIPTION OF THE PREFERRED EMBODIMENTS

Figure 1:
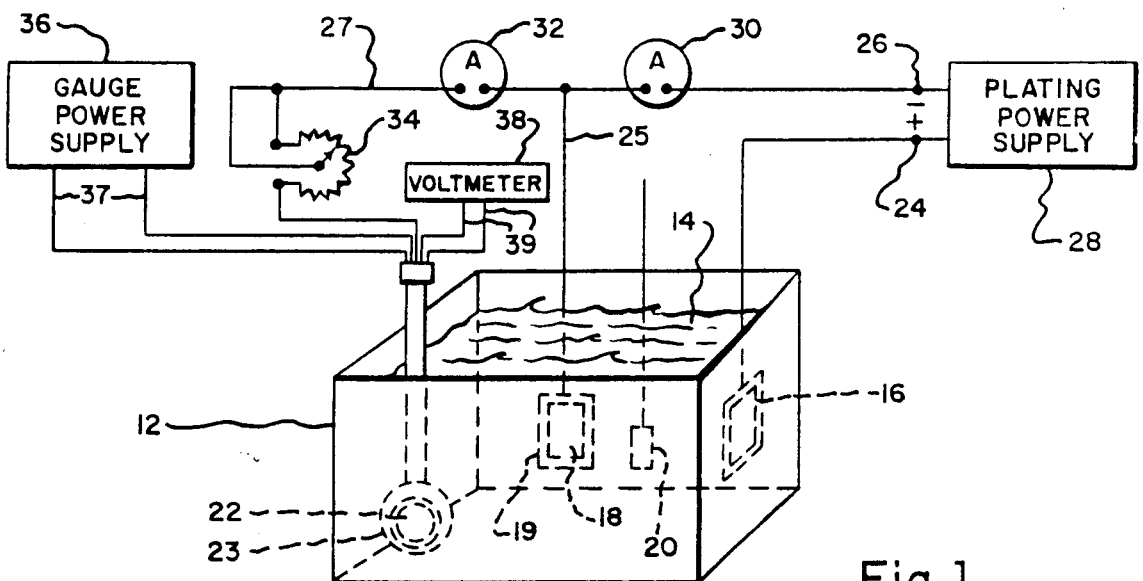
FIG. 1 is a block diagram of an electroplating process and apparatus which includes stress-monitoring apparatus according to the present invention.

Referring to FIG. 1, there is generally illustrated apparatus and a method for plating an object. In the process, an electroplating solution such as, for example, a solution 14 of sulfamate nickel is contained within a tank 12. Submerged in the solution 14 is an anode 16. Also submerged in the solution 14 is a cathode which comprises the object 18 to be electroplated. It should be understood that, while the present invention is described herein with respect to an electroplating bath, the apparatus of the present invention may have application in various other processes wherein a coating is applied to a material such as, for example, vacuum deposition, electroless deposition (auto-catalytic), and the application of paint onto an object.

Illustrated generally at 22 is an apparatus, in accordance with the present invention, for monitoring stress on a coating of material, illustrated schematically at 23, which is deposited simultaneously or parallel with the coating 19 of material applied to the cathode 18 for use in determining the stress in the coating 19 of material applied to the object or cathode 18.

Connected between anode 16 and cathode 18 are the positive and negative terminals 24 and 26 respectively of a plating power supply 28. Plating power supply 28 supplies an electroplating current through circuit 25 which is conducted between anode 16 and cathode 18 through the electroplating bath 14. The stress-monitoring apparatus 22 is also connected to the plating power supply negative terminal 26 in parallel with cathode 18 in a circuit 27 whereby plating power supply 28 also supplies an electroplating current which is conducted between anode 16 and gauge 22 through the electroplating bath 14. Suitable ammeters 30 and 32 are provided for measuring the currents in the circuits 25 and 27 respectively for use in regulating, by suitable means such as perhaps 0 to 10 ohm rehostate 34 in gauge circuit 27 and in accordance with principles commonly known to those of ordinary skill in the art to which this invention pertains, the currents supplied to the cathode 18 and gauge 22 respectively so that equal current per unit area may be supplied whereby the rate of thickness increase on each surface may be equalized and the stress measured in the gauge coating 23 may therefore be accurately related to the stress in the object coating 19. Plating power supply 28 may be any suitable power supply, for example, a Hewlett-Packard 6295B or Trygon Model SR-20-70 -OVS 220. Since the area of the object plating surface may be one the order of perhaps two square feet, the ammeter 30 therefor is preferably designed to measure accordingly the large currents on the order of perhaps 50 amps, which may be required for plating thereof, and the aforesaid Trygon power supply, which may be able to provide such a current, may be used. The area of the surface of gauge 22 to be plated may perhaps be less than 2 square inches requiring a plating current on the order of perhaps 250 milliamps, and ammeter 32 may be sized accordingly. In accordance with the present invention, any other suitable means of providing current to the object 18 and gauge 22 may be provided such as, for example, an independent plating power supply for each of the object 18 and the gauge 22.

Figure 2:
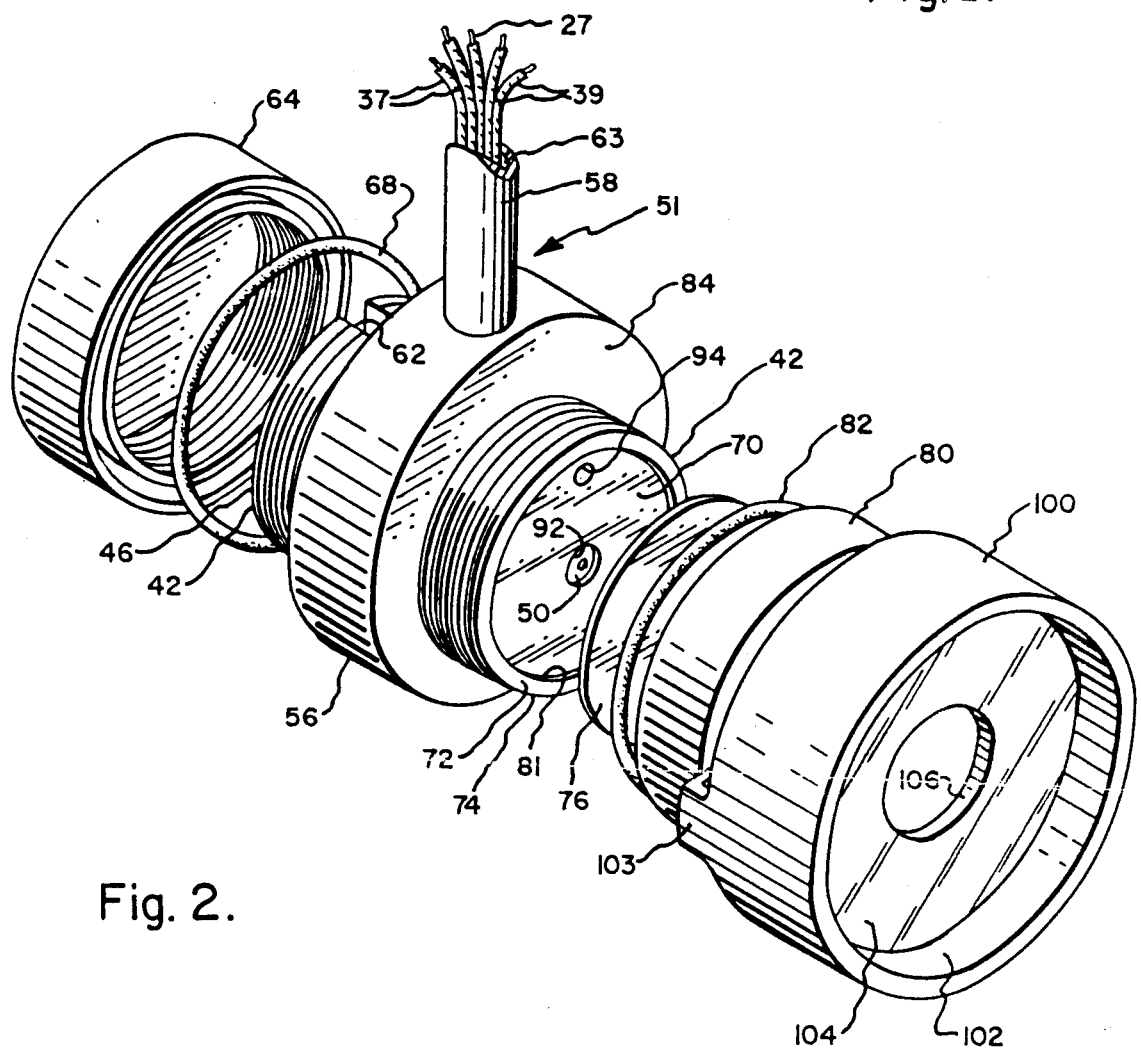
FIG. 2 is a blown-up perspective view of apparatus which embodies the present invention.
Figure 3:
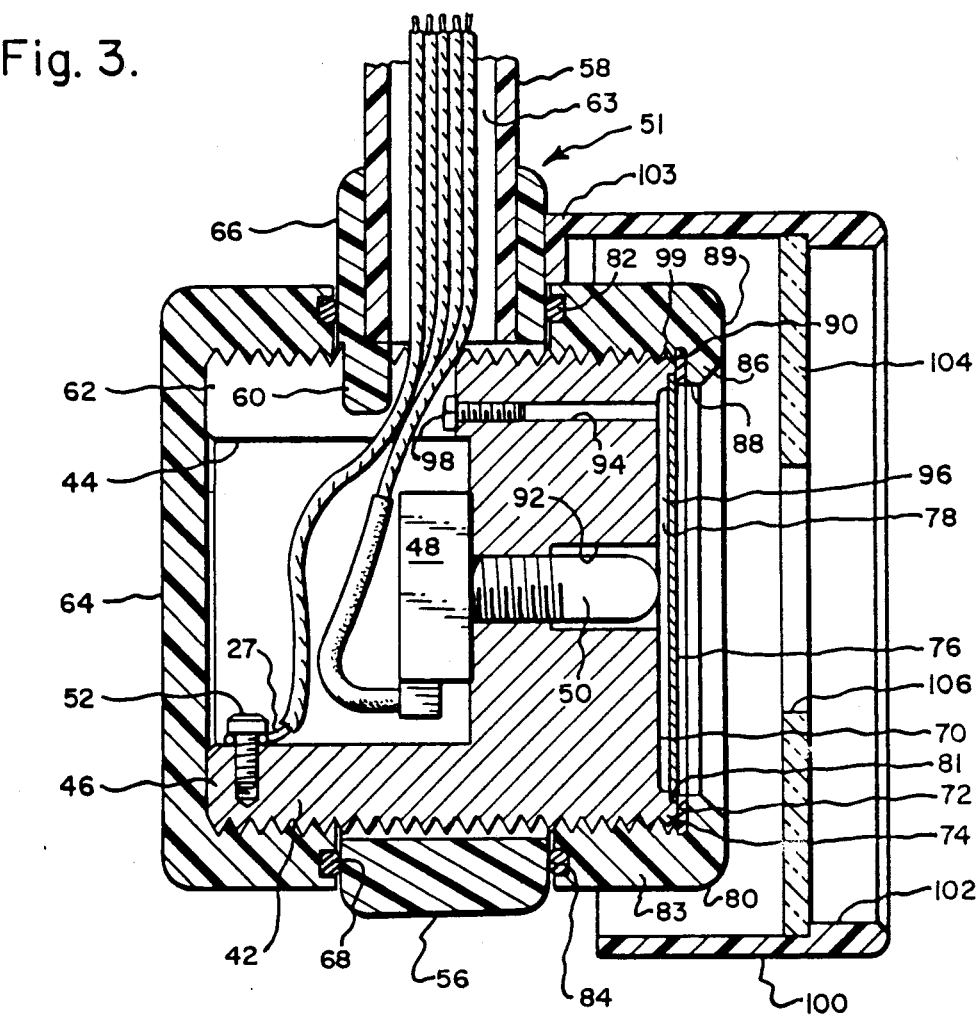
FIG. 3 is a longitudinal-sectional view of the apparatus of FIG. 2.
Figure 4:
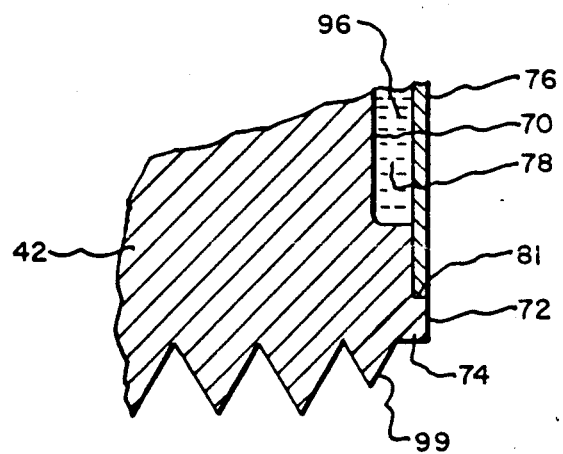
FIG. 4 is an enlarged detailed view of a portion of the apparatus of FIG. 2.

Referring to FIGS. 2, 3, and 4, the stress-monitoring apparatus 22 comprises a generally cylindrical housing 42 composed of aluminum or other suitable material the circumference of which may be threaded over the length thereof. The housing 42 may typically have a diameter of roughly 1-½" and a length of roughly 1-½". A bore 44 is formed in one end 46 of the housing 42 for containing a pressure transducer illustrated at 48. The transducer 48 may be of any suitable kind, for example, a 136PC pressure sensor marketed by the Micro Switch Division of Honeywell. Voltage, typically of about 5 to 16 volts DC, is supplied to the transducer 48 for operation thereof from a suitable power supply, illustrated at 36 in FIG. 1, through lines 37. This voltage may be provided by suitable batteries for portable use. Output from the transducer 48 is supplied to voltmeter, illustrated at 38 in FIG. 1, through lines 39.

The housing 42 includes a notch or slot 62 which extends completely through the wall thereof and of perhaps 0.385" in width along the length of the bore 44 through which electrical input and output lines 27, 37, and 39 are led.

A member illustrated generally at 51 which serves as a handle for the housing 42 and for leading the electrical input and output lines 27, 37, and 39 out of the bath so that they are protected from the bath 14 comprises a hollow disk 56 having a width of perhaps 11/16" which surroundingly engages the central portion of the housing 42 and into which an elongated cylindrical hollow member 58 having a length of perhaps 16" is suitably inserted and attached such as by threading and/or gluing it into a radial aperture in the disk member 56, the shank member 58 extending radially from the disk member and housing. The disk member 56 and shank 58 may be composed of any suitable material which is stable, easy to machine or mold, and provides adequate protection in the bath for the electrical lines 27, 37, and 39, for example, CPVC (chlorinated polyvinyl chloride). A pin 60, which may be a radial extension of the disk 56, extends radially inwardly from the disk member 56 to engage the notch or slot 62 to prevent rotation of the housing 42 with respect to the disk member 56 so that the electical wires 27, 37, and 39 are not damaged. The wires 27, 37, and 39 are led from the bore 44 through the notch 62 and into the hollow disk member 56 between the sidewalls 66 and 84 thereof and then through the hollow center 63 of the conduit or shank 58. The bore 44 is sealed as will be described hereinafter against entrance of bath fluid 14. Thus, the electrical wires 27, 37, and 39 may be led out of the bath 14 without coming into contact with the bath.

An end cap 64, composed of a suitable material such as CPVC, threadedly engages the bore end 46 of the housing 42 and abuts one wall 66 of the disk member 56. The end cap 64 is suitably sealed to the wall 66 of the disk member 56 such as by means of O-ring 68 so as to prevent entrance of plating bath 14 into the bore 44.

The housing 42 includes a wall 70 which is recessed a distance of perhaps 0.11" from the end 72 of the housing, which end 72 is opposite the end 46 and defines a circumferential ledge 74 extending axially outwardly from wall 70 and upon which is received a diaphragm 76 to define a chamber 78 between the diaphragm 76 and the recessed housing wall 70. The chamber 78 may have a diameter of perhaps 1.375" and a depth, therefore, of perhaps 0.11". The diaphragm 76 is flat plate of material having a thickness of perhaps 0.01". It is preferably composed of a chemically and mechanically stable material which has minimum hysteresis, for example, 321 stainless steel which preferably contains a small amount of niobium or is otherwise austenitic for corrosion resistance. In very harsh environments, it may be desirable to plate the stainless steel with gold or platinum. Other suitable materials include molybdenum, tungsten, gold-plated quartz, or a ceramic plated with a suitable metal.

An end cap 80, composed of a suitable material such as CPVC, threadedly engages the housing 42 at end 72 to sealingly secure the diaphragm 76 in position. The depth of each of the end caps 64 and 80 is such that the end caps 80 and 64 may fit tightly to opposite walls of the disk member 56. For example, with the housing 42 having a length of 1.5" and disc 56 having a width of perhaps 0.68", each end cap 64 and 80 may have a depth of perhaps 0.41" and may have an overall width of perhaps 0.56". An O-ring 82 or other suitable sealing means is provided for sealing the end cap 80 to the wall 84 of disk member 56. The end cap 80 includes a cylindrical portion 83 threadedly received by the housing 42 and a ledge 86 extends from the axially outer end portion of the housing radially inwardly a distance of perhaps 0.12" and circumferentially about the housing 42. When the end cap 80 is threaded onto the housing 42 and tightened, the ledge 86 engages the end 72 of housing 42 and the diaphragm 76 along its outer circumferential periphery. The ledge 86 defines an aperture 88 in the end cap 80 through which the bath 14 makes direct contact with the diaphragm 76 for plating thereof. The ledge 86 may be canted at an angle of perhaps 30 to 45 degrees with the axis of end cap 80 so that the aperture 88 has a greater diameter at the axially outer surface 89 of the end cap 80, as shown in FIG. 3.

The ledge 86 provides a seat for a flat ring 90 for sealing the end cap 80 to the diaphragm 76 to prevent entrance of the bath 14 into the chamber 78. The flat ring 90 may be composed of any suitable material which is inert to chemicals which may be found in the bath and which is pliant, for example, an electrical grade RTV (room temperature vulcanizing) rubber or other soft, inert elastomer.

The diaphragm 76 is held within a notch 81 of ledge 74 against lateral displacement. The notch 81 is preferably centered relative to the lead thread, illustrated at 99, on the housing 42 rather than the axis of the housing so that the seat is uniform whereby the gasket 90 my be centered over the diaphragm 76 to reduce the possibility of leakage, increase thermal stability, and reduce the possibility of warping of the diaphragm 76 as the assembly heats and cools since, with the gasket centered over the diaphragm, the edge stresses may be more uniform during such heating and cooling.

A port 92 extends centrally through the housing 42 between the chamber 78 and the bore 44 to provide communication between the transducer 48 and fluid in the chamber 78. The transducer 48 threadedly and sealingly engages a first or threaded portion of the port 92 with the sensing portion 50 thereof extending into a second or enlarged portion of the port 92, as shown in FIG. 3, to sense fluid pressure in the chamber 78 in accordance with principles commonly known to one of ordinary skill in the art to which this invention pertains.

A bleeder line 94 extends axially between the chamber 78 and the slot 62 to provide a means of bleeding air from the fluid 96 in the chamber 78. A threaded bolt 98 with O-ring or other sealing means (not shown) threadedly engages the bleeder line 94 from the slot 62 to close the bleeder line 94.

Plating current is carried from wire 27 through the aluminum housing 42 to the diaphragm 76 to provide an electrical charge thereon for the purposes of electroplating material on the diaphragm. Electrical wire 27 is led into the slot 62 then the bore 44 from the hollow shank 58 and disk member 56 and is attached to the housing 42 by any suitable means such as screw 52.

A shield 100 is preferably provided to shield extraneous currents from the diaphragm 76 to allow more uniform plating thereof. The shield 100 comprises a cylindrical member 102 which may be composed of any suitable material compatible with the fluids in the bath 14 such as, for example, CPVC. One end of the cylindrical member 102 has suitable means such as three circumferentially spaced resilient tab members 103 extending radially inwardly for press fitting the end of the shield over the front end cap 80. The other or front end portion of cylindrical member 102 is enclosed by a member 104 which is composed of methyl methacrolate material, glass, or other inert suitable material which preferably allows observation therethrough of the plating process on the diaphragm 76 and which has an aperture 106 centrally thereof for entrance of plating fluid 14.

Changes in the stress on the diaphragm 76 as it is plated or coated with a plating material will cause it to deform thereby increasing or decreasing the pressure in the fluid 96 which is in the enclosed sealed chamber 78. The pressure transducer 48 senses the change in fluid pressure and converts the fluid pressure to electrical signals which are indicative of the stress in the coating of material. These electrical signals are measured by voltmeter 38 or other suitable means such as recorders or computers. The plating bath 14 can then be suitably adjusted, in accordance with principled commonly known to one of ordinary skill in the art to which this invention pertains, so that the stress in the plating of the object 18 may be reduced. The true stress may be determined from the pressure transducer signal and the deposit thickness and material properties. This data may be processed by integrating or computing devices in accordance with principles commonly known to one of ordinary skill in the art to which this invention pertains to provide immediate or direct stress values. Repeat tests may be conducted with stripping of the sample substrate deferred for a number of perhaps 20 tests by using charts, calculations, and/or computer software in accordance with principles commonly known to one of ordinary skill in the art to which this invention pertains.

Thermal expansion differences between the housing 42 and the fluid 96 in the chamber 78 may affect the accuracy of the readings. While the fluid 96 may be any suitable generally incompressible fluid such as vegetable or mineral oil, it is preferred that the thermal expansion rate of the fluid 96 equal the thermal expansion rate of the material of the housing 42. In order to match the approximate volume coefficient of thermal expansion of 81 ppm/degree C. (parts per million per degree Centrigrade) of the aluminum housing 42 so that differences in the thermal expansion rates will not appreciably affect the accuracy of the output from the transducer 48, in accordance with a preferred embodiment of the present invention the fluid 96 is selected to be peanut oil, which has a coefficient of thermal expansion of approximately 200 ppm/degree C., which is substantially equal thereto. Additional stability may be achieved by mixing fluids such as ethylene glycol and water to achieve closer matches in expansion, or, if otherwise desirable, using fluids such as bromochloro trifluoro ethane or mercury. However, if desired, a suitable temperature probe, illustrated at 20 in FIG. 1, which may be electrically connected to a suitable monitor and power supply (not shown), may be provided in the plating fluid to monitor temperature changes so that even minor differences in thermal expansion may be taken into consideration for even greater accuracy.

The stress-monitoring apparatus 22 may be assembled by first screwing the transducer 48 into the housing 42. With the bleeder screw 98 loosely engaging the bleeder line 94, fluid 96 is poured into the chamber 78. The diaphragm 76 is then positioned in the notch 81 on the ledge 86, and the front end cap 80 is screwed onto the housing 42. The assembly is then inverted, the bleeder screw 98 removed, and a vacuum drawn by a suitable means such as a bell jar to remove any air in the fluid 96. If significant air is removed from the fluid 96, it may be necessary to add a drop or two more of the fluid with an eyedropper or the like. Alternately, bubbles in the fluid may be released with a small wire by pushing the wire through the bleeder hole 94. After any air is removed from the fluid, the bleeder screw 98 is then replaced and tightened, and the housing 42 with the front end cap 80 screwed thereon is inserted into the disk member 56. The electrical lines 27, 37, and 39 are then attached, and the back end cap 64 is screwed onto the housing 42.

A metal deposit deposited with some stress applies a pressure or force to the surface of the diaphragm 76 which as a result tends to move (be deformed) and presses against the relatively incompressible fluid 96. The fluid in turn applies a pressure against a sensor diaphragm surface in the transducer 48 causing the transducer diaphragm to deform so that the volume of the chamber 78 remains constant. The deformation of the transducer diaphragm is converted to electrical signals indicative of the stress in the coating of material.

It is to be understood that the invention is by no means limited to the specific embodiments which have been illustrated and described herein, and that various modifications thereof may indeed be made which come within the scope of the present invention as defined by the appended claims.

What is claimed is:

1. Apparatus for monitoring stress in a coating of material comprising:
   a. a housing having a chamber means;
   b. a deformable diaphragm means forming one wall of said chamber means and having an outer surface for receiving the coating of material and having an inner surface;
   c. a generally incompressible fluid filling said chamber means and in contact with said deformable diaphragm means inner surface to have a pressure due to pressing of said diaphragm means against said fluid which is indicative of stress in the coating; and
   d. a pressure transducer means in communication with said fluid for sensing the fluid pressure and converting the fluid pressure to electrical signals whereby the electrical signals are indicative of the stress in the coating of material.

2. Apparatus according to claim 1 wherein said fluid is one which has a coefficient of thermal expansion which is substantially equal to the volume coefficient of thermal expansion of the material of which said housing is composed.

3. Apparatus according to claim 1 wherein said housing is composed of aluminum and said fluid is selected from the group of fluids consisting of peanut oil and a mixture of ethylene glycol and water.

4. Apparatus according to claim 1 wherein said diaphragm means is composed of an austenitic stainless steel which contains niobium.

5. Apparatus according to claim 1 wherein said housing comprises a cylindrical member having a pair of end portions at least one of which has a thread including a lead thread of receiving an end cap for securing said diaphragm to said housing, means in said at least one end portion defining a circumferential notch for receiving said diaphragm, said notch being centered relative to said lead thread for sealing accuracy.

6. Apparatus according to claim 1 further comprising means for shielding said diaphragm from extraneous electrical energy.

7. Apparatus according to claim 1 further comprising means including a bleeder screw and a bleeder line for bleeding air from said fluid.

8. A method for monitoring stress in a coating of material comprising the steps of:
   a. applying the coating of the material to a surface of a deformable diaphragm;
   b. causing the diaphragm to press against and thereby effect a pressure change in a generally incompressible fluid which fills a chamber such that the pressure in the fluid is indicative of stress in the coating of material; and
   c. converting the fluid pressure to electrical signals whereby the electrical signals are indicative of the stress in the coating of material on the diaphragm.

9. A method according to claim 8 wherein the chamber is contained in a housing, the method further comprising selecting the fluid to have a coefficient of thermal expansion which is substantially equal to the volume coefficient of thermal expansion of the material of which the chamber housing is composed.

10. A method according to claim 8 wherein the chamber is contained in a housing, the method further comprising selecting the housing to be composed of aluminum and selecting the fluid from the group of fluids consisting of peanut oil and a mixture of ethylene glycol and water.

11. A method according to claim 8 wherein the chamber is contained in a housing, and the housing comprises a cylindrical member having a pair of end portions at least one of which has a thread including a lead thread for receiving an end cap for securing the diaphragm to the housing, the method further comprises centering the diaphragm relative to said lead thereof.

12. A method according to claim 8 further comprising shielding said diaphragm from extraneous electrical energy.

13. A method according to claim 8 further comprising bleeding air from the fluid filling the chamber.

14. Apparatus for monitoring stress in a coating of material comprising a deformable diaphragm, a cylindrical housing having first and second threaded end portions, said first end portion including a recessed wall, a circumferentially extending ledge means having means defining a notch for receiving said diaphragm spaced from said recessed wall, and first end cap means for threadedly receiving said first end portion and sealingly engaging said diaphragm to said ledge means whereby said recessed wall, said ledge means, and said diaphragm define a sealed chamber means, means in said first end cap means allowing fluid in which the apparatus is submerged to contact said diaphragm for coating thereof, means for applying a coating of the material to said diaphragm, a generally incompressible fluid filling said chamber means and in contact with said diaphragm means to have a pressure due to pressing of said diaphragm means against said fluid which is indicative of stress in the coating, a pressure transducer means, aperture means in said second end portion and opening into said chamber means for receivably positioning said pressure transducer means in contact with said fluid to sense the fluid pressure and convert the fluid pressure to electrical signals whereby the electrical signals are indicative of the stress in the coating of material, and means for sealing said aperture means against the escape of the fluid therethrough.

15. Apparatus according to claim 14 wherein said diaphragm is composed of an electrically conductive material and the apparatus further comprises electrical lines for supplying plating current to said diaphragm, operating power to said transducer means, and transmitting signals indicative of the stress from said transducer means, a hollow disc member surroundingly engaging said housing inter mediate said end portions and which is open to said disc member and sealingly engaged thereto, a slot means in said second end portion for routing said electrical lines from said aperture means into said disc member, said shank member being in communication with said disc member for routing said electrical lines form said disc member into said shank member, a second end cap for threadedly receiving said second end portion, and means for sealingly engaging each of said end caps to said disc member whereby said electrical lines and said transducer means may be protected from a fluid in which the housing is submerged for coating of the diaphragm.

16. Apparatus according to claim 15 further comprising inwardly protruding means on said disc member which protruding means is received in said slot means for preventing movement of said disc member circumferentially relative to said housing.

17. Apparatus according to claim 15 wherein said housing is composed of an electrically conductive material, and said electrical line for supplying plating current to said diaphragm is attached to said housing in said aperture means whereby the plating current is conducted through the housing to the diaphragm.

18. Apparatus according to claim 14 wherein said fluid is one which has a coefficient of thermal expansion which is substantially equal to the volume coefficient of thermal expansion of the material of which said housing is composed.

19. Apparatus according to claim 14 wherein said housing is composed of aluminum and said fluid is selected from the group of fluids consisting of peanut oil and a mixture of ethylene glycol and water.

20. Apparatus according to claim 14 further comprising a lead thread on said first end portion, and said notch means is center relative to said lead thread whereby the diaphragm may be centered relative to the lead thread.

* * * * *